Feb. 27, 1951 B. A. TREVOR 2,543,736

PULSE MULTIPLEX SYSTEM EMPLOYING STEP-WAVE COMMUTATION

Filed June 28, 1946 4 Sheets-Sheet 1

INVENTOR

Bertram A. Trevor

BY H. S. Grover

ATTORNEY

Feb. 27, 1951

B. A. TREVOR

PULSE MULTIPLEX SYSTEM EMPLOYING STEP-WAVE COMMUTATION 2,543,736

Filed June 28, 1946

4 Sheets-Sheet 2

INVENTOR

Bertram A. Trevor

BY H. S. Grover

ATTORNEY

Feb. 27, 1951

B. A. TREVOR

PULSE MULTIPLEX SYSTEM EMPLOYING STEP-WAVE COMMUTATION 2,543,736

Filed June 28, 1946

4 Sheets-Sheet 3

INVENTOR
Bertram A. Trevor
BY H. S. Grover
ATTORNEY

Feb. 27, 1951

B. A. TREVOR

PULSE MULTIPLEX SYSTEM EMPLOYING STEP-WAVE COMMUTATION 2,543,736

Filed June 28, 1946

4 Sheets-Sheet 4

INVENTOR
Bertram A. Trevor
BY H. S. Grover
ATTORNEY

Patented Feb. 27, 1951

2,543,736

UNITED STATES PATENT OFFICE 2,543,736

PULSE MULTIPLEX SYSTEM EMPLOYING STEP-WAVE COMMUTATION

Bertram A. Trevor, Riverhead, N. Y., assignor to Radio Corporation of America, a corporation of Delaware Application June 28, 1946, Serial No. 679,909

19 Claims. (Cl. 179—15)

This invention relates to pulse communication systems wherein the common transmission medium is allotted to several audio frequency channels on a time division basis. Such systems are sometimes referred to as pulse multiplex circuits.

It is known to provide a pulse radio communication system employing eight audio channels each of which has an audio frequency response up to 3 kilocycles. In such systems the pulse position or time of occurrence of the pulse in each channel is varied over a limited range in accordance with the signal modulation of that channel. In such known systems it is the practice to produce a synchronizing or marker pulse of predetermined width or duration followed by eight spaced smaller duration pulses. These smaller duration pulses are the channel pulses. This sequence is repeated many times per second. Systems of this type have been developed for and used by the Government. One type is known as the AN/TRC-5 system and is described in the copending application of William D. Houghton, Serial No. 608,957, filed August 4, 1945, now Patent No. 2,531,817, granted November 28, 1950. Details of such systems are described in copending applications Serial Nos. 607,296, filed July 27, 1945, now Patent No. 2,540,524, granted February 6, 1951; 617,634, filed September 20, 1945, now Patent No. 2,441,418, granted May 11, 1948; and 602,447, filed January 30, 1945, now Patent No. 2,440,049, granted April 20, 1948; all by William D. Houghton. Other types are described in the literature, for example, Radio Craft, for February, 1946, pages 314 et seq., published by Radcraft Publications, Inc., Springfield, Mass.

The present invention has for one of its objects to provide a pulse communication system which can accommodate a considerably greater number of channels than the prior art pulse systems. This is achieved at the sacrifice of channel frequency band width, which is not important for many types of signal communications systems, as for example, those using printer signals of the five or seven unit type.

Another object of the invention is to provide a pulse multiplex comunication system which can accommodate as many as ninety narrow frequency band channels with good stability of operation.

A further object is to provide a multi-channel pulse communication system employing over each sequence of operation a plurality of synchronizing pulses equally spaced apart by groups of channel pulses of shorter duration.

A more detailed description of the invention follows in conjunction with drawings, wherein a 28 channel system is described and illustrated. It should be understood, however that the principles of the invention are equally applicable to a smaller and larger number of channels and are not limited to the 28 channel system herein which is given by way of example only.

Figure 1:
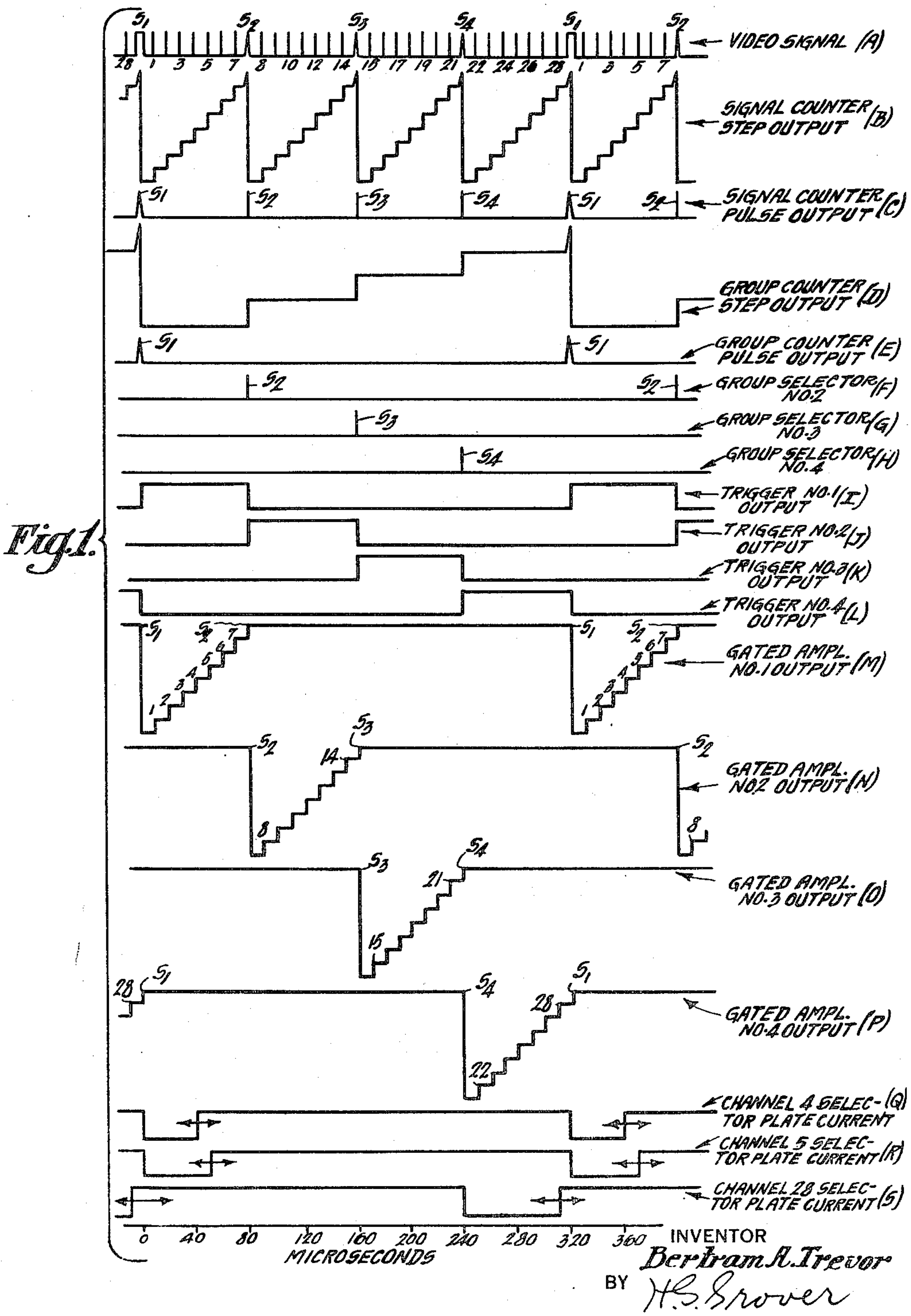
Fig. 1 is a series of curves graphically illustrating different voltage wave forms appearing in different parts of the system of the invention.
Figure 2:
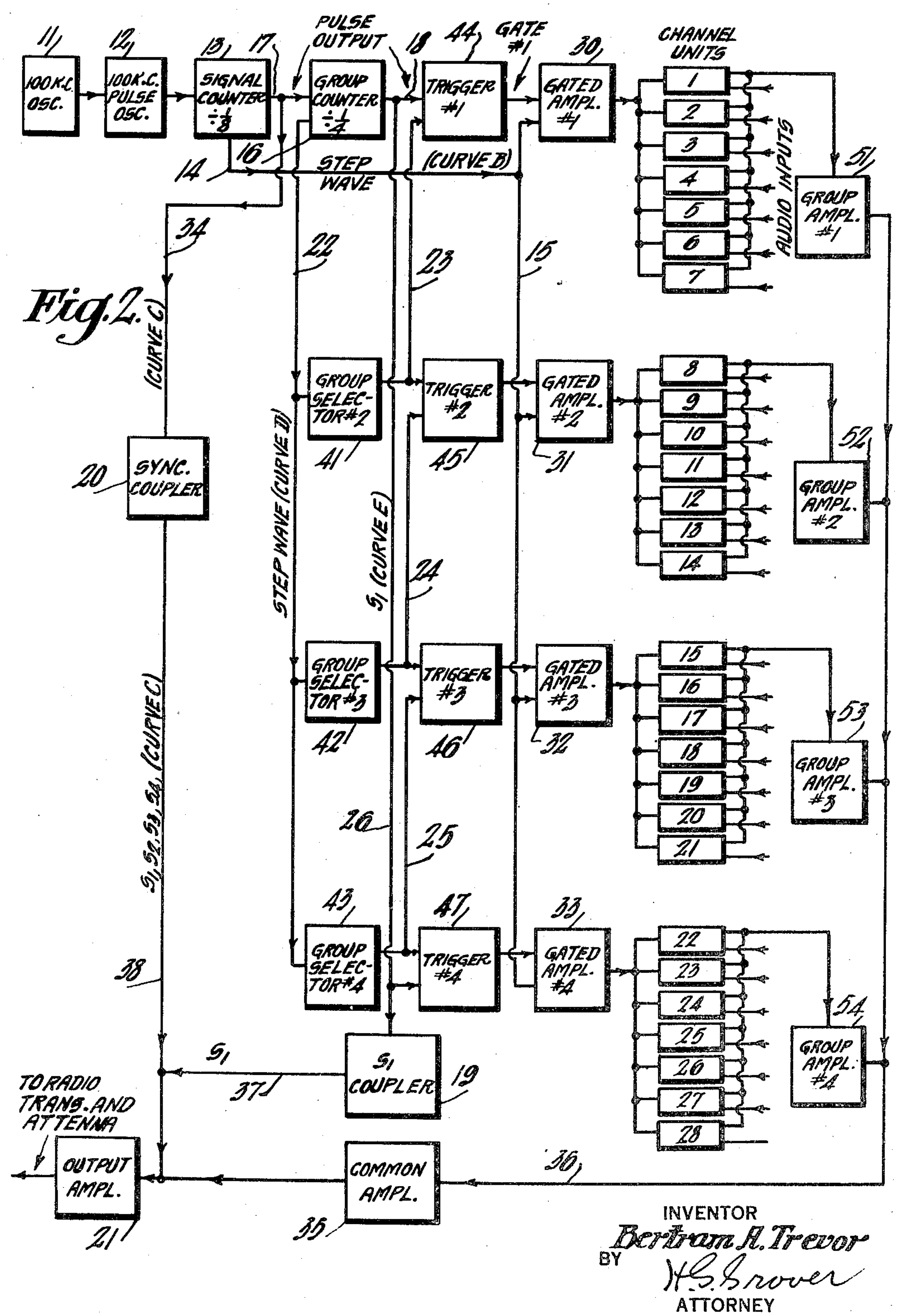
Fig. 2 illustrates, in box form, the complete transmitting system for the pulse multiplex communication system of the invention.
Figure 3:
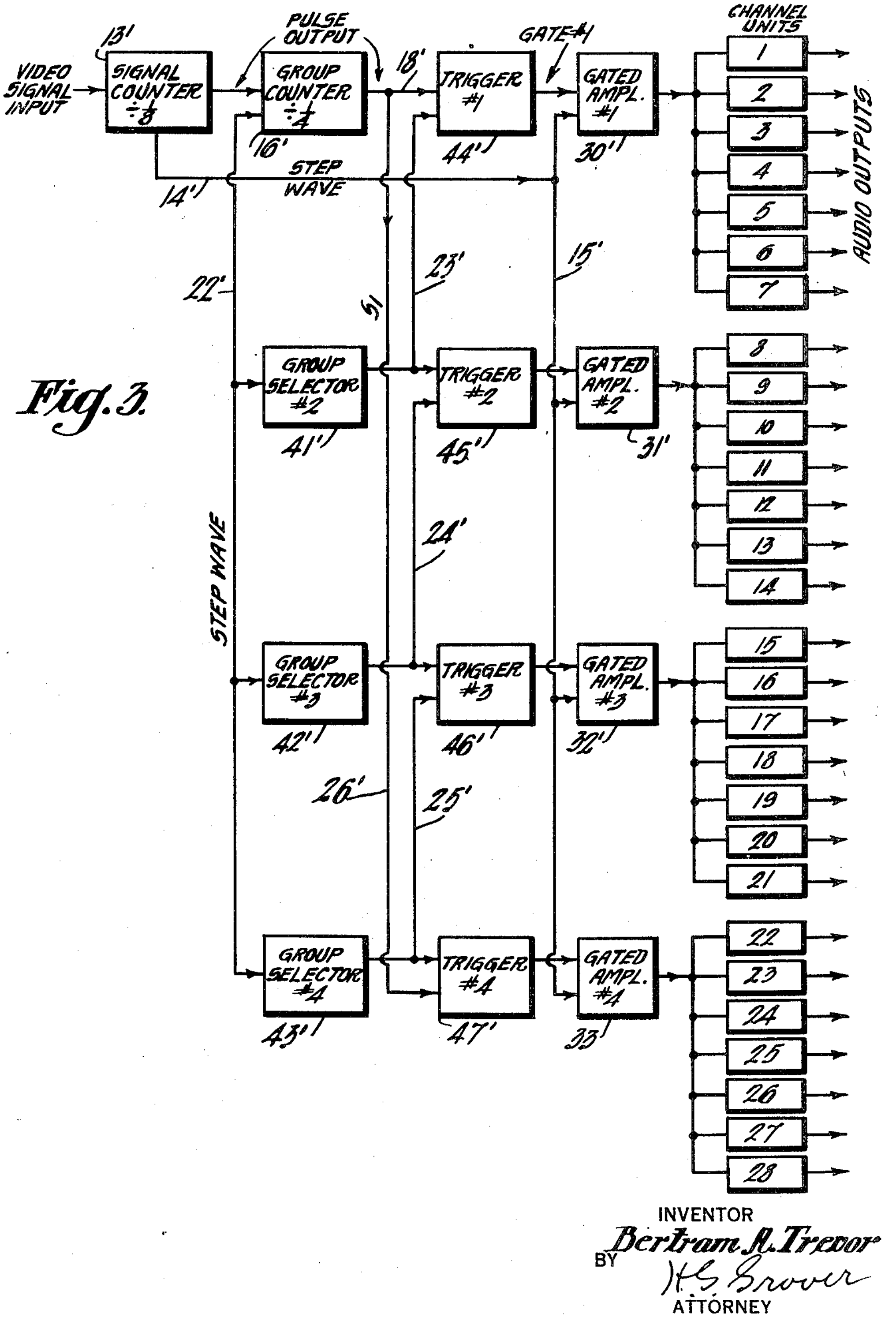
Fig. 3 illustrates, in box form, the essential parts of the receiving system of the pulse multiplex communication system of the invention.

The transmitter of Fig. 2 and the receiver of Fig. 3 are used in a 28 channel multiplex system and utilize short pulses of radio frequency energy which are time displaced by modulation. For multiplexing purposes, the pulses corresponding to the separate channels are separately and consecutively generated at a fixed repetition rate. Fig. 1, curve A, illustrates the frame or video output of the transmitter of Fig. 2. An inspection of curve A will show that there are four marker or synchronizing pulses S1, S2, S3 and S4 evenly spaced throughout the basic time period, plus the 28 channel pulses distributed, as shown. This basic time period may be defined as that interval of time during which there occurs a complete sequence of pulses. Between each pair of adjacent synchronizing pulses there are seven spaced channel pulses. Thus, there are 28 channel pulses positioned between each synchronizing pulse in one sequence and the same synchronizing pulse appearing in the next sequence. The synchronizing pulses are wider than the channel pulses, and synchronizing or marker pulse S1 is wider than any of the other synchronizing pulses. The reason for this is to allow the separation of this pulse to determine the starting time of the basic time period shown as zero on the time scale (abscissa) of the curves of Fig. 1.

The number of channel pulses between each synchronizing pulse and the next adjacent synchronizing pulse (here shown as seven) is arbitrarily chosen, as also is the number of synchronizing pulses. The synchronizing pulses are inserted between groups of channel pulses at such locations as to insure stable operation in the handling of a single group of channel pulses.

Thus, as a general rule, there will be ten or less number of channel pulses between adjacent synchronizing pulses due to limitations of stability in the counter circuits employed in the system of the invention.

Modulation of the pulses in the individual channels is accomplished by displacing in time the channel pulse in question, such that the time displacement is proportional to the audio frequency input amplitude to that channel. This method of modulation is adequately described in U. S. Patent 2,441,418, granted May 11, 1948, to W. D. Houghton.

Figure 4:
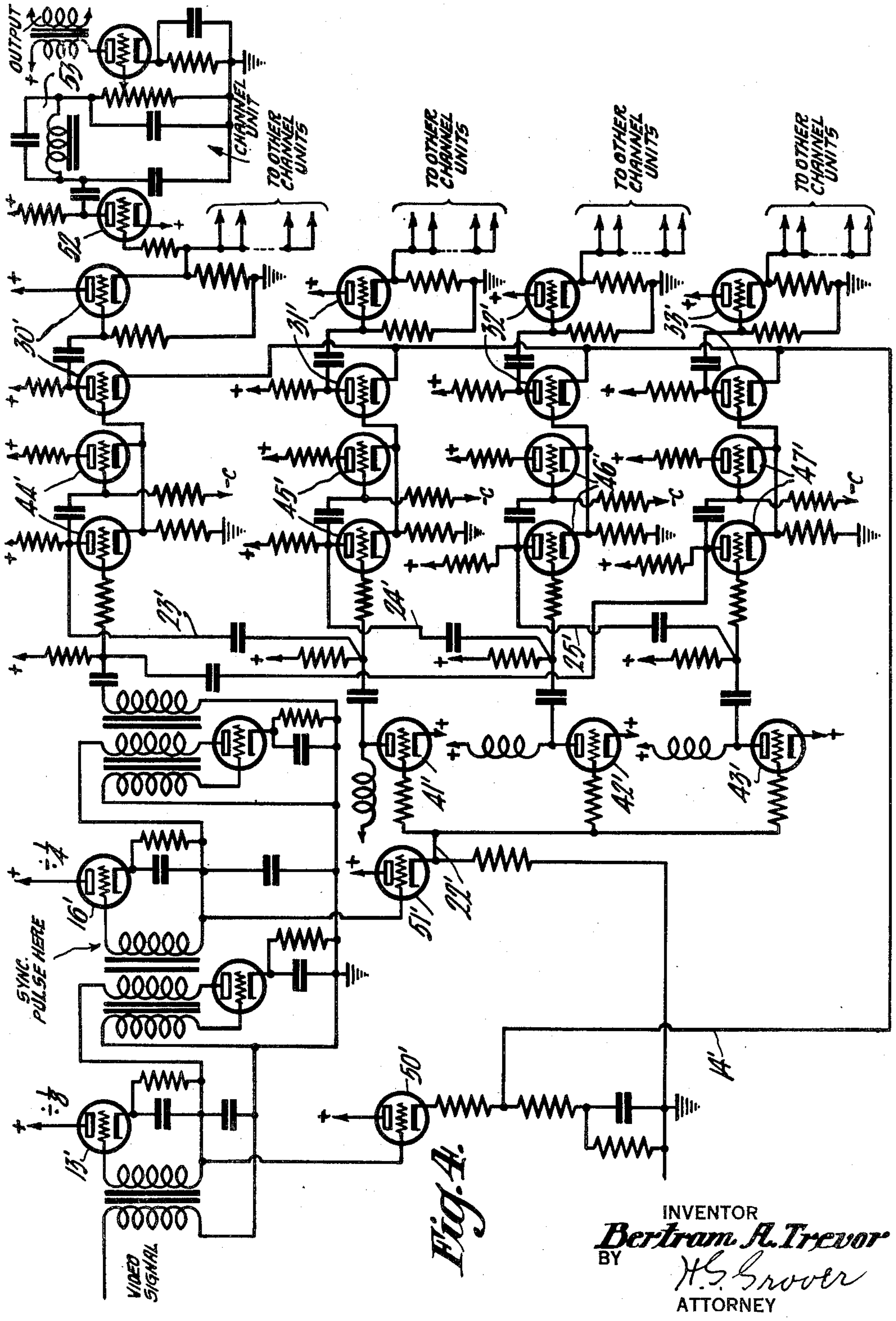
Fig. 4 schematically illustrates the circuit details of the receiving system of Fig. 3.

In Fig. 2, there is shown a 100 kilocycle stable oscillator 11, such as a crystal controlled oscillator, producing pulses of current which feed into and lock by injection a 100 kilocycle short pulse oscillator 12. The short output pulses from the pulse oscillator 12 are spaced 10$\mu$s. (microseconds) apart and are applied to a signal counter or step wave generator 13. Counter 13 may have the form shown in my copending application Serial No. 612,034, filed August 22, 1945, with the addition of a cathode follower tube in order to deliver over lead 14 the generated step wave, in turn fed in a common circuit 15 to the four gated amplifiers 30, 31, 32 and 33. This counter 13 with the cathode follower tube is shown in Fig. 4 and described hereinafter in more detail, and is adjusted to a count of eight, in order to provide an output pulse in response to eight input pulses. Other forms of counters may be employed, for example as shown in Houghton copending application Serial No. 607,296, filed July 27, 1945. The step wave generated by counter 13 is shown in curve B of Fig. 1 and appears in leads 14 and 15.

The pulse output from counter 13 is fed via lead 17 to the group counter 16, in turn adjusted to a count of four. Signal counter 13 thus has two outputs, one a step wave made up of eight steps or risers and appearing in leads 14 and 15, and the other a pulse output occurring at the discharge of the step wave and at the synchronizing pulse rate S1, S2, S3 and S4 and which appears in lead 17. The pulses from signal counter 13 appearing in lead 17 are spaced $10\times8=80\mu$s. (microseconds) apart and are shown in curve C of Fig. 1.

The group counter 16 may be of the same form as signal counter 13 but is adjusted to a count of four. The step wave output of group counter 16 is shown in curve D of Fig. 1 and appears in lead 22, while the pulse output of group counter 16 is shown in curve E of Fig. 1 and appears in leads 18 and 26. The output pulses of curve E (from the group counter 16) are spaced $80\times4=320$ $\mu$s. (microseconds) apart and occur at intervals corresponding to the basic time period, or the S1 period.

The pulse output from the signal counter 13 (curve C) is also fed via lead 34 to a synchronizing coupler vacuum tube 20, and thence via lead 38 to an output power amplifier tube 21. The pulse output from the group counter 16 (curve E) is fed via lead 26 to a coupler vacuum tube 19 and thence via lead 37 to the same output amplifier 21. Couplers 19 and 20 serve to fix the widths of the S1 pulse relative to the other synchronizing pulses S2, S3 and S4 as will be described in more detail later.

The step wave output from the group counter which appears in lead 22 (curve D) is fed to the three group selectors 41, 42 and 43. Group selector 41 consists of a vacuum tube circuit biased such that it becomes conducting on the first rise of the applied step wave of curve D corresponding in time with the synchronizing pulse S2 or at a time of 80 microseconds from S1. Group selector 42 is biased to become conducting on the second rise of the step wave of curve D corresponding in time with the synchronizing pulse S3. Group selector 43 is biased to become conducting on the third rise of the step wave of curve D corresponding in time with the synchronizing pulse S4.

Group selectors 41, 42 and 43 may be of the form illustrated and described as channel selectors 18 in the copending application of Houghton, Serial No. 608,957 supra. The selectors are differently biased and each selector is normally biased well beyond the cut-off condition. The bias of each selector tube is so adjusted that the applied step wave from the group counter 16 (curve D) in lead 22 causes current to flow consecutively in the different selectors. The different selectors conduct on different rises of voltage in the step wave, curve D. Each step rise in the step wave (curve D) is great enough to insure that during its occurrence the current of a particular selector shall be driven rapidly from beyond the cut-off condition to a zero bias value. Once a selector tube starts to conduct, the current flow therein will continue until the end of the basic time period, when the input voltage to the selector drops to zero at the end of the step wave. The group selectors each contain means for differentiating the sudden conduction of current therethrough, and in so doing each delivers a pulse corresponding in time to the synchronization pulses S2, S3 and S4, respectively, as shown in curves F, G and H of Fig. 1. The group selectors 41, 42 and 43 all become nonconducting at the end of the step wave (curve D) corresponding in time with synchronizing pulse S1.

The pulse output from group counter 16 (curve E) is fed via lead 18 to trigger circuit 44. The outputs from group selectors 41, 42 and 43 (curves F, G and H) are fed to trigger circuits 45, 46 and 47 respectively. Trigger circuits 44 to 47 are each composed of two vacuum tubes interconnected regeneratively to produce a circuit having one degree of electrical stability. These trigger circuits are sometimes referred to as flip-flop circuits. In the normal or stable state of the trigger circuit, one tube is drawing current and the other tube is non-conductive. In the active or unstable state caused by a firing, triggering or initiating pulse applied to the input of the trigger circuit, the current passing conditions of the two tubes are reversed. Trigger circuit 44 is fired by the S1 output pulse (curve E) from the group counter 16. Trigger 45 is fired by the S2 pulse (curve F) from group selector 41. Trigger 46 is fired by the S3 pulse (curve G) from group selector 42. Trigger 47 is fired by the S4 pulse (curve H) from group selector 43.

The cross-connection 23 from trigger circuit 45 to trigger circuit 44 provides the driving pulse to restore trigger circuit 44 to its stable state. The cross-connection 24 from trigger circuit 46 to trigger circuit 45 provides the driving pulse to restore trigger circuit 45 to its stable state. The cross-connection 25 from trigger circuit 47 to trigger circuit 46 provides the driving pulse to restore trigger circuit 46 to its stable state. The cross-connection 26 from the trigger circuit 44 to trigger circuit 47 provides the driving pulse to restore trigger circuit 47 to its stable state. Thus trigger circuit 44 is fired by group counter 16 and restored to its normal or stable state by group selector 41. Trigger circuit 45 is fired by group selector 41 and is turned off or restored to normal by group selector 42. Trigger circuit 46 is fired by group selector 42 and is turned off by group selector 43. Trigger circuit 47 is fired by group selector 43 and is turned off by group counter 16.

The output of trigger circuit 44 is the gate pulse shown in curve I, Fig. 1, and this gate pulse is fed to the gated amplifier 30. The output of trigger circuit 45 is the gate pulse shown in curve J, Fig. 1, and this gate pulse is fed to gated amplifier 31. The output of trigger circuit 46 is the gate pulse shown in curve K, Fig. 1, and this gate pulse is fed to gated amplifier 32. The output of trigger circuit 47 is the gate pulse shown in curve L, which gate pulse is fed to the gated amplifier 33. These gated amplifiers are biased to be normally non-conductive and require the gate pulses to cause current to pass therein. It will thus be seen that the outputs from the different trigger circuits occur at different non-overlapping times to control the different gated amplifiers in succession. It should be noted that synchronization pulse S1 is used to restore trigger circuit 47 to its stable state, after which the same sequence or cycle of operations is repeated over the next basic time period of 320 microseconds.

The four gate pulses (curves I, J, K and L) are fed consecutively to the gated amplifiers 30, 31, 32 and 33 along with the step voltage wave (curve B) in leads 14 and 15 emanating from signal counter 13. The gated amplifiers 30 to 33 are arranged to pass the step wave only for the duration of its own gate pulse, thus giving the gated amplifier outputs shown in curves M, N, O and P of Fig. 1.

Each gated amplifier feeds a blank of seven channel units which can be of the type described by William D. Houghton in copending application Serial No. 608,957 supra and U. S. Patent 2,441,418. Thus, gated amplifier 30 feeds a bank containing channel units 1 to 7 inclusive, while gated amplifier 31 feeds a bank containing channel units 8 to 14 inclusive, and gated amplifiers 32 and 33 feed banks containing channel units 15 to 21 and 22 to 28, inclusive. Each channel is individually modulated by its own audio signal input (such as a printer signal of the five- or seven-unit type) and this signal input gives a time (position) displacement modulation of the channel pulse. Each bank of seven channel units delivers seven modulated channel pulses in succession to its own group amplifier 51, 52, 53 or 54. The outputs from the group amplifiers 51 to 54 are fed into a common lead 36 and combined in a common amplifier 35. The output of the common amplifier 35 is combined with the properly formed synchronizing pulses from leads 37 and 38 and fed to the output amplifier 21. The video signal output from the output amplifier may look like curve A (Fig. 1) in the absence of modulation, and this output may be fed to a suitable radio transmitter, such as a magnetron to produce correspondingly positioned short duration pulses of ultra high frequency energy. It should be noted that there is a time allotted for each channel pulse and each synchronizing pulse and that they do not overlap in the output amplifier.

In order to make the first synchronizing pulse S1 wider than the other synchronizing pulse S2, S3 and S4, there is introduced the S1 coupler circuit 19 which serves to provide in lead 37 a S1 pulse which is wider than the S1 pulse in lead 38 coming from coupler 20. These two S1 pulses overlap in time.

By way of example, only, each channel pulse may have a time duration of one microsecond, the synchronizing pulse S1 may have a time duration of three microseconds, while the synchronizing pulses S2, S3 and S4 may have a time duration of two microseconds. The channel pulses may be modulated $\pm 3\frac{1}{2}$ microseconds peak modulation, thus leaving a guard space between pulses from succeeding channels of about three microseconds. The radio frequency pulses from the radio transmitter (magnetron) may be of the order of 1000 megacycles or higher.

The receiving system is shown in Fig. 3. The incoming radio frequency channel and synchronizing pulses are received on an antenna, detected in a suitable receiver preferably of the superheterodyne type, and the rectified or unidirectional pulses comprise the video signal input fed to the signal counter 13′. Those circuits of Fig. 3 which are similar to and operate in similar manner to the circuits of Fig. 2, have been given the same reference numerals but with prime designations.

The operation of the receiving system shown in Fig. 3 is similar to that of the transmitting system shown in Fig. 2. The video input signals which are applied to the signal counter 13′ are shown in curve A of Fig. 1. Signal counter 13′ is adjusted so that it is always discharged by the synchronizing pulses and gives a count of eight. The pulse output of signal counter 13′ is fed to the group counter 16′ which is adjusted to give a count of four so that it always discharges on the synchronizing pulse S1. This is easily done since the synchronizing pulse S1 is wider than all other pulses. The group selectors, the trigger circuits and the gated amplifiers are consecutively operated in exactly the same manner as described in the reference to the transmitting apparatus of Fig. 2 and provides the same wave forms shown in curves A through P of Fig. 1.

Each of the channel units 1 to 28 of Fig. 3 may comprise a single biased selector vacuum tube with a low pass filter in its anode circuit followed by an audio amplifier. Each of these channel selector tubes in the channel units may be of the form illustrated and described as channel selector 18 in the copending application of William D. Houghton, Serial No. 608,957 supra, and may be of a type similar to the group selectors. This is shown in more detail in Fig. 4. The bias for each channel tube is adjusted to bring about conduction on the corresponding step rise of the curves M, N, O, P of Fig. 1. The anode currents of channel tubes 4, 5 and 28 only are shown in curves Q, R and S, respectively, of Fig. 1, as illustrative of the operation of the different channel tube circuits. These anode currents consist of pulses at the basic time period rate whose duty factor or percent mark varies in accordance with the channel modulation. It should be noted that each channel unit becomes conductive at a time corresponding to the step riser for that channel. The time of occurrence of the step riser varies in accordance with the signal modulation for that channel, because the step wave is generated by the signal and synchronizing pulses which are fed into the signal counter. Although the step riser may vary in time, the time period of each step wave is constant since the synchronizing pulses which are unmodulated serve to discharge the signal counter. In the output of each channel selector, there is provided a low pass filter which removes all but the audio frequency components.

The circuit details of the receiving multiplex system shown in Fig. 3 are illustrated in Fig. 4, wherein corresponding elements have been given the same reference characters.

Referring to Fig. 4 in more detail, the signal counter is designated 13′. This signal counter provides a pulse output to the group counter 16′ and a step wave output via cathode follower 50′ to lead 14′. A signal counter of this type is shown in my copending application Serial No. 612,034, filed August 22, 1945. The pulse output from the group counter is supplied to the flip-flop or trigger circuit 44′ while the step wave output from group counter 16′ is supplied via coupling tube 51′ and lead 22′ to the different group selectors 41′, 42′ and 43′. The trigger circuits 44′, 45′, 46′ and 47′ are similar in construction and supply non-overlapping pulse outputs to the gated amplifiers 30′, 31′, 32′ and 33′. It should be noted that the group counter 16′ supplies a negative output pulse to fire the trigger circuit 44′ and that negative pulses are utilized to restore the trigger circuits to their normal state. The gated pulses from the trigger circuits, however, are of positive polarity and fed to the gated amplifiers. Each channel unit comprises a single biased vacuum tube 52 and a low pass filter 53.

From the foregoing description of the system, it is obvious that the principles of the invention may be employed in connection with a greater number of selectors than those illustrated in the drawings, with a corresponding increase in the number of synchronizing pulses to give a greater number of audio channels. The number of channel pulses between consecutive synchronizing pulses may also be increased to obtain more channels.

In the above description (given by way of example only), only four synchronizing pulses were employed in order to more easily analyze a simple system employing the principles of the invention. By way of illustration, however, if ninety channels were desired, in a system constructed in accordance with the invention, such an arrangement can be achieved by making the signal counters 13 and 13′ count to ten and group counters 16 and 16′ also count to ten.

An advantage of the present invention lies in the ability to provide many narrow band audio channels on a time division basis without the necessity of using complicated and heavy band pass filters which are ordinarily required with the usual frequency separation method.

In a system constructed in accordance with the invention and employing twenty-eight channels, the individual channel pulse rate may be 3.125 kilocycles, based on the use of a 100 kilocycle pulse oscillator in the transmitter and the use of four synchronizing pulses. Hence, each audio channel can have an audio frequency response up to one kilocycle. If more audio channels are to be employed using the 100 kilocycle timing oscillator in the transmitting system, the audio response of each channel would have to be lowered. If more channels were desired with the same frequency response of about one kilocycle, as in the case of a twenty-eight channel system, the 100 kilocycles oscillator frequency would have to be raised. Obviously, the invention is not limited to the use of a pulse system wherein a 100 kilocycle pulse oscillator is employed in the transmitter, since, if desired, the pulse oscillator can be one which produces pulses anywhere in the range of 10 kilocycles to 500 kilocycles.

What is claimed is:

1. A multi-channel pulse communication system comprising a stable source producing pulses at a rate between 10 kilocycles and 500 kilocycles, a counter circuit coupled to and controlled by said source and producing two output waves one of which is a pulse whose repetition rate is in subharmonic relation to the pulse rate of said stable source and the other of which is a step wave voltage recurring at the subharmonic rate and having a number of risers, a plurality of amplifiers normally biased to cut-off, means for feeding said step wave voltage over a common circuit to said amplifiers, and means coupled between said counter circuit and said amplifiers and responsive to said one output pulse wave of subharmonic relation for sequentially overcoming the cut-off bias of said amplifiers at said subharmonic rate, whereby said amplifiers sequentially pass the step wave voltage, a plurality of channel circuits coupled to the output of each amplifier, said channel circuits being differently biased to become responsive on different risers of the step wave passed by its associated amplifier, and a common output amplifier for all of said channel circuits.

2. A multi-channel pulse communication system comprising a stable source producing pulses at a rate between 10 kilocycles and 500 kilocycles, a counter circuit coupled to said source and producing two output waves one of which is a pulse whose repetition rate is in subharmonic relation to the pulse rate of said stable source and the other of which is a step wave voltage recurring at the subharmonic rate and having a number of steps, a plurality of amplifiers normally biased to cut-off, means for feeding said step wave voltage over a common circuit to said amplifiers, and means coupled between said counter circuit and said amplifiers and responsive to said one output pulse wave of subharmonic relation for sequentially overcoming the cut-off bias of said amplifiers at said subharmonic rate, whereby said amplifiers sequentially pass the step wave voltage, said last means including individual trigger circuits for controlling said amplifiers, and selector circuits for selectively controlling said trigger circuits, a plurality of channel circuits coupled to the output of each amplifier, said channel circuits being differently biased to become responsive on different risers of the step wave passed by its associated amplifier, and a common output amplifier for all of said channel circuits.

3. A multi-channel pulse communication system comprising a stable source producing pulses at a rate between 10 kilocycles and 500 kilocycles, a counter circuit coupled to said source and producing two output waves one of which is a pulse whose repetition rate is in subharmonic relation to the pulse rate of said stable source and the other of which is a step wave voltage recurring at subharmonic rate and having a desired number of steps, a plurality of amplifiers normally biased to cut-off, means for feeding said step wave voltage over a common circuit to said amplifiers, and means coupled between said counter circuit and said amplifiers and responsive to said one output pulse wave of subharmonic relation for sequentially overcoming the cut-off bias of said amplifiers at said subharmonic rate, whereby said amplifiers sequentially pass the step wave voltage, a plurality of channel circuits coupled to the output of each amplifier, said channel circuits being differently biased to become responsive on different risers of the step wave passed by its associated amplifier, individual audio signal modulating circuits for said channel circuits, a common output amplifier for said channel circuits, and an ultra high frequency transmitter coupled to and responsive to the output of said output amplifier.

4. A multi-channel pulse communication system comprising a source of unidirectional pulses having a radio frequency repetition rate, a counter circuit coupled to said source and producing two output waves one of which is a pulse whose repetition rate is in subharmonic relation to the repetition rate of said unidirectional pulses and the other of which is a step wave voltage recurring at the subharmonic rate and having a desired number of steps, a plurality of amplifiers normally biased to cut-off, means for feeding said step wave voltage over a common circuit to said amplifiers, and means coupled between said counter circuit and said amplifiers and responsive to said one output pulse wave of subharmonic relation for sequentially overcoming the cut-off bias of said amplifiers at said subharmonic rate, whereby said amplifiers sequentially pass the step wave voltage, a plurality of channel circuits coupled to the output of each amplifier, said channel circuits being differently biased to become responsive on different steps of the step wave passed by its associated amplifier, and amplifier means coupled to the output of said channel circuit.

5. A multi-channel pulse communication system comprising a source of unidirectional pulses having a radio frequency repetition rate, a counter circuit coupled to said source and producing two output waves one of which is a pulse whose repetition rate is in subharmonic relation to the repetition rate of said unidirectional pulses and the other of which is a step wave voltage recurring at the subharmonic rate and having a desired number of steps, a plurality of amplifiers normally biased to cut-off, means for feeding said step wave voltage over a common circuit to said amplifiers, and means coupled between said counter circuit and said amplifiers and responsive to said one output pulse wave of subharmonic relation for sequentially overcoming the cut-off bias of said amplifiers at said subharmonic rate, whereby said amplifiers sequentially pass the step wave voltage, a plurality of channel circuits coupled to the output of each amplifier, said channel circuits being differently biased to become responsive on different risers of the step wave passed by its associated amplifier, each of said channel circuits comprising a single biased vacuum tube having a low pass filter coupled to its output, and an audio amplifier coupled to said low pass filter.

6. A multi-channel pulse communication system comprising a source of unidirectional pulses having a radio frequency repetition rate, a counter circuit coupled to said source and producing two output waves one of which is a pulse whose repetition rate is in subharmonic relation to the repetition rate of said unidirectional pulses and the other of which is a step wave voltage recurring at the subharmonic rate and having a desired number of steps, a plurality of amplifiers normally biased to cut-off, means for feeding said step wave voltage over a common circuit to said amplifiers, and means coupled between said counter circuit and said amplifiers and responsive to said one output pulse wave of subharmonic relation for sequentially overcoming the cut-off bias of said amplifiers at said subharmonic rate, whereby said amplifiers sequentially pass the step voltage, said last means including individual trigger circuits for controlling said amplifiers, and selector circuits for selectively controlling said trigger circuits, a plurality of channel circuits coupled to the output of each amplifier, said channel circuits being differently biased to become responsive on different risers of the step wave passed by its associated amplifier, each of said channel circuits comprising a single biased vacuum tube having a low pass filter coupled to its output, and an audio amplifier coupled to said low pass filter.

7. A multi-channel pulse communication comprising a stable source of pulses, a frequency divider and step wave generator circuit coupled to and responsive to said source for producing pulses whose repetition rate is a subharmonic of the frequency of said source and for producing recurring step wave voltages at said subharmonic rate, each of said step wave voltages having a number of risers corresponding to the frequency divisor, a plurality of electronic paths, connections for supplying said step wave voltages to said electronic paths, and means coupled to said frequency divider and step wave generator circuit and responsive to the pulses produced thereby for sequentially causing said electronic paths to become conducting at said subharmonic rate, whereby each electronic path becomes conducting for the duration of and passes a step wave voltage, and a plurality of electron discharge device channel circuits coupled to the output of each of said electronic paths, the channel circuits associated with each path being differently biased to become conductive on different risers of the step wave voltage passed thereto by the path.

8. A multi-channel pulse communication comprising a stable source of pulses, a frequency divider and step wave generator circuit coupled to said source for producing pulses whose repetition rate is a subharmonic of the frequency of said source and for producing recurring step wave voltages at said subharmonic rate each of which has a number of risers corresponding to the frequency divisor, a plurality of amplifiers normally biased to cut-off, means for feeding step wave voltage over a common circuit to said amplifiers, and means coupled between said frequency divider and said amplifiers and responsive to the pulses produced by said frequency divider for sequentially overcoming the cut-off bias of said amplifiers at said subharmonic rate, whereby said amplifiers sequentially pass the step wave voltage, a plurality of channel circuits coupled to the output of each amplifier, said channel circuits being differently biased to become responsive on different risers of the step wave passed by its associated amplifier, each of said channel circuits producing a short pulse, a common output stage for all of said channel circuits, and means for supplying to said common output stage a plurality of spaced synchronizing pulses which occur at said subharmonic rate and which separate the pulses produced by the channel circuits associated with one amplifier from the pulses produced by the channel circuits associated with another amplifier, as a result of which there occurs during each sequence of operations groups of channel pulses which are separated by a plurality of synchronizing pulses.

9. A multi-channel pulse communication comprising a stable source of pulses, a frequency divider and step wave generator circuit coupled to said source for producing pulses whose repetition rate is a subharmonic of the frequency of said source and for producing recurring step wave voltage at said subharmonic rate each of which has a number of risers corresponding to the frequency divisor, a plurality of amplifiers normally biased to cut-off, means for feeding said step wave voltage over a common circuit to said amplifiers, and means coupled between said frequency divider and said amplifiers and responsive to the pulses produced by said frequency divider for sequentially overcoming the cut-off bias of said amplifiers at said subharmonic rate, whereby said amplifiers sequentially pass the step wave voltage, a plurality of channel circuits coupled to the output of each amplifier, said channel circuits being differently biased to become responsive on different steps of the step wave passed by its associated amplifier, individual signal modulating circuits for said channel circuits, each of said channel circuits producing a short pulse, said modulating circuits serving to vary the timing of the pulses produced by the channel circuits in accordance with a characteristic of the signal modulation, a common output stage for all of said channel circuits, and means for supplying to said common output stage a plurality of spaced synchronizing pulses which occur at said subharmonic rate and which separate the pulses produced by the channel circuits associated with one amplifier from the pulses produced by the channel circuits associated with another amplifier, as a result of which there occurs during each sequence of operations groups of channel pulses which are separated by a plurality of synchronizing pulses, said synchronizing pulses being of longer duration than the pulses produced by said channel circuits.

10. In the transmitting station of a multi-channel pulse communication system, the method of operation which includes producing a series of recurring pulses, dividing the frequency of occurrence of said pulses by a predetermined number to produce other pulses of another repetition rate, producing from said series a step wave voltage having a number of risers corresponding to said predetermined number and which step wave voltage recurs at the frequency divided rate, sequentially passing said step wave voltage over different paths, and sequentially producing pulses from the different risers of each step wave voltage which is passed over a path.

11. In a multi-channel pulse communication system, the method of operation which includes producing a series of recurring pulses, dividing the frequency of occurrence of said pulses to produce other pulses of another repetition rate, producing from said series of recurring pulses a step wave voltage having a number of risers corresponding to the frequency divisor and which step wave voltage recurs at the frequency divided rate, sequentially controlling different paths by said other pulses, sequentially passing said step wave voltage over said different paths, and sequentially producing pulses from the different risers of each step wave voltage which is passed over a path.

12. A multi-channel pulse communication system comprising a stable source producing pulses at a rate between 10 kilocycles and 500 kilocycles, a counter circuit coupled to and controlled by said source and producing two output waves one of which is a pulse whose repetition rate is in subharmonic relation to the pulse rate of said stable source and the other of which is a step wave voltage recurring at the subharmonic rate and having a number of risers, a plurality of amplifiers normally biased to cut-off, means for feeding said step wave voltage over a common circuit to said amplifiers, and means including another counter circuit coupled between said first counter circuit and said amplifiers and responsive to said one output pulse wave of subharmonic relation for sequentially overcoming the cut-off bias of said amplifiers at said subharmonic rate, whereby said amplifiers sequentially pass the step wave voltage, a plurality of channel circuits coupled to the output of each amplifier, said channel circuits being differently biased to become responsive on different risers of the step wave passed by its associated amplifier, and a common output amplifier for all of said channel circuits.

13. In a terminal station of a multi-channel pulse communication system, the method of operation which includes producing a series of recurring pulses, producing from said series a step wave voltage which recurs at a sub-harmonic frequency of said recurring pulses, sequentially passing said step wave voltage over different paths respectively representing different channel circuits, and sequentially producing pulses from the different risers of each step wave voltage which is passed over a path.

14. The method of operating a multi-channel communication system which includes, producing a plurality of phase displaced step voltage waves each of which has a plurality of risers of different voltage values, the phase displacement being such that any one riser in one step wave occurs at a time different from a riser in another step wave, controlling different channel circuits from the different risers, producing a single polarity pulse in each of said channels and modulating said pulse in accordance with a message wave.

15. The method of operating a multi-channel comunication system which includes, producing a plurality of sequentially occurring phase displaced step voltage waves each of which has a plurality of risers of different voltage values, the phase displacement being such that any one riser in one step wave occurs at a time different from a riser in another step wave, controlling different channel circuits from the different risers, producing a single polarity pulse in each of said channels and modulating said pulse in accordance with a message wave, said channel pulses being time displaced and non-overlapping.

16. The method of operating a multi-channel communication system which includes, producing a plurality of phase displaced step voltage waves each of which has a plurality of risers of different voltage values, the phase displacement being such that any one riser in one step wave occurs at a time different from a riser in another step wave, corresponding risers of the phase displaced step voltage waves controlling different channel circuits, producing pulses in said channels and respectively modulating the pulses produced in different channels by different intelligence waves.

17. In a terminal station of a multi-channel pulse communication system, the method of operation which includes producing a series of recurring pulses, producing from said series a step wave voltage which recurs at a sub-harmonic frequency of said recurring pulses, sequentially passing said step wave voltage over different paths respectively representing different channel circuits, sequentially producing pulses from the different risers of each step wave voltage which is passed over a path, and modulating the pulses by different signals.

18. In combination, first and second step voltage wave generators, means coupling both of said step wave generators together for controlling the operation of said second step wave generator from said first step wave generator, communication circuits controlled by the output of said second step wave generator and differently biased to become effective at different risers in the step voltage waves produced by said first generator, and means for supplying the step voltage wave output of said first generator to said communication circuits.

19. The method of operating a multi-channel communication system which includes producing a plurality of phase displaced step voltage waves each of which has a plurality of risers of different voltage values, the phase displacement being such that each step wave sequentially follows another step wave at the termination thereof, corresponding risers of succeeding step waves controlling different channel circuits, producing pulses in said channels, and respectively modulating the pulses produced in different channels by different intelligence waves.

BERTRAM A. TREVOR.

REFERENCES CITED

The following references are of record in the file of this patent:

UNITED STATES PATENTS

| Number | Name | Date |
|---|---|---|
| 2,048,081 | Riggs | July 21, 1936 |
| 2,172,354 | Blumlein | Sept. 12, 1939 |
| 2,199,634 | Koch | May 7, 1940 |
| 2,231,375 | Watson | Feb. 11, 1941 |
| 2,311,021 | Blumlein | Feb. 16, 1943 |
| 2,405,238 | Seeley | Aug. 6, 1946 |
| 2,405,239 | Seeley | Aug. 6, 1946 |
| 2,444,036 | Crost | June 29, 1948 |
| 2,468,059 | Grieg | Apr. 26, 1949 |